US012763979B2

(12) United States Patent
Mee et al.

(10) Patent No.: US 12,763,979 B2
(45) Date of Patent: Oct. 13, 2026

(54) HEADERS CLIENT FOR DETERMINING THE BEST CHAIN

(71) Applicant: nChain Licensing AG, Zug (CH)

(72) Inventors: Andrew James Mee, London (GB); Michael Fletcher, London (GB)

(73) Assignee: nChain Licensing AG, Zug (CH)

( * ) Notice: Subject to any disclaimer, the term of this patent is extended or adjusted under 35 U.S.C. 154(b) by 29 days.

(21) Appl. No.: 18/274,178

(22) PCT Filed: Apr. 29, 2022

(86) PCT No.: PCT/EP2022/061626
§ 371 (c)(1),
(2) Date: Jul. 25, 2023

(87) PCT Pub. No.: WO2022/238154
PCT Pub. Date: Nov. 17, 2022

(65) Prior Publication Data
US 2024/0106670 A1 Mar. 28, 2024

(30) Foreign Application Priority Data
May 14, 2021 (GB) ...................................... 2106950

(51) Int. Cl.
*H04L 9/00* (2022.01)
*H04L 67/104* (2022.01)
*H04W 88/18* (2009.01)

(52) U.S. Cl.
CPC ............. *H04L 9/50* (2022.05); *H04W 88/182* (2013.01); *H04L 67/104* (2013.01)

(58) Field of Classification Search
CPC ....... H04L 9/50; H04L 67/104; H04W 88/182
See application file for complete search history.

(56) References Cited

U.S. PATENT DOCUMENTS 10,691,665 B1 * 6/2020 Zhang ................. G06F 16/2315
10,691,676 B1 * 6/2020 Zhang ................. G06F 16/2379
(Continued)

FOREIGN PATENT DOCUMENTS

WO 2020165677 A1 8/2020
WO 2021064565 4/2021
(Continued)

OTHER PUBLICATIONS

PCT/EP2022/061626 International Search Report and Written Opinion dated Aug. 12, 2022, 13 pages.
(Continued)

*Primary Examiner* — Azizul Choudhury
(74) *Attorney, Agent, or Firm* — Galvani Smith PLLC; Rowan P. Smith

(57) ABSTRACT

There is provided mechanisms for managing data in a blockchain network. In one embodiment, there is provided a computer implemented method performed at a headers client and comprising the following steps. Receiving a plurality of block headers from at least one external source, external to the headers client, the block headers each referring to a block in a blockchain. Storing the received plurality of block headers in a storage module. Analysing the plurality of block headers by validating the proof-of work for the plurality of received headers. Determining a best chain of block headers from the analysed plurality of block headers and storing the best chain at the storage module. The best chain can be a chain of blocks from genesis, which is a first block in the blockchain, to a current best block, which is a latest block in the blockchain. The best block may have the highest cumulative proof-of-work.

17 Claims, 4 Drawing Sheets

(56) References Cited

U.S. PATENT DOCUMENTS

| | | | | |
|---|---|---|---|---|
| 11,157,899 | B1 * | 10/2021 | Nelson | G06F 9/4401 |
| 11,290,280 | B1 * | 3/2022 | Nelson | H04L 9/3239 |
| 11,354,629 | B1 * | 6/2022 | Nelson | H04L 9/0637 |
| 11,501,269 | B1 * | 11/2022 | Nelson | G06Q 20/065 |
| 2003/0041110 | A1 * | 2/2003 | Wenocur | H04L 63/126 709/206 |
| 2016/0085955 | A1 * | 3/2016 | Lerner | H04L 9/0869 726/20 |
| 2019/0279172 | A1 * | 9/2019 | Duffield | H04L 9/3239 |
| 2020/0252221 | A1 | 8/2020 | Zamani et al. | |
| 2022/0108313 | A1 * | 4/2022 | Ribeiro | G06Q 20/065 |
| 2023/0119035 | A1 * | 4/2023 | Mee | G06Q 20/36 705/75 |

FOREIGN PATENT DOCUMENTS

| | | |
|---|---|---|
| WO | 2021165816 | 8/2021 |
| WO | 2021165817 | 8/2021 |
| WO | 2021165848 | 8/2021 |

OTHER PUBLICATIONS

GB2106950.5 Combined Search Report and Abbreviated Examination Report dated Sep. 8, 2021, 6 pages.

Walker Greg: "The Longest Chain—Blockchain Guide", Sep. 5, 2019 (Sep. 5, 2019), XP055948739, Retrieved from the Internet: URL: https://learnmeabitcoin.com/technical/longest-chain [retrieved on Aug. 3, 2022] p. 1/12-p. 6/12.

Simon Holmgaard Kamp et al: "Weight-Based Nakamoto-Style Blockchains", IACR, International Association for Cryptologic Research, vol. 20210115:141701, Jan. 15, 2021 (Jan. 15, 2021), pp. 1-29, XP061052067, Retrieved from the Internet: URL: https://eprint.iacr.org/2020/328.pdf [retrieved on Jan. 15, 2021] abstract Chapters 3-5.

Satoshi Nakamoto: "Bitcoin: A Peer-to-Peer Electronic Cash System", Oct. 31, 2008 (Oct. 31, 2008), pp. 1-9, XP055547572, Retrieved from the Internet: URL: https://bitcoin.org/bitcoin.pdf [retrieved on Jan. 25, 2019] Section 8.

Anonymous: "leveldb—How Does Bitcoin Core Client Keep Track of Longest Chain/Strongest PoW Chains?—Bitcoin Stack Exchange", Oct. 20, 2019 (Oct. 20, 2019), XP055948769, Retrieved from the Internet: URL: https://bitcoin.stackexchange.com/questions/91142/how-does-bitcoin-core-client-keep-track-of-longest-chain-strongest-pow-chains?rq=1 [retrieved on Aug. 3, 2022] the whole document.

Office Action for Japanese Patent Application No. 2023-539022, mailed on Feb. 17, 2026, 9 pages.

* cited by examiner

HEADERS CLIENT FOR DETERMINING THE BEST CHAIN

CROSS REFERENCE TO RELATED APPLICATIONS

This application is the U.S. National Stage of International Application No. PCT/EP2022/061626 filed on Apr. 29, 2022, which claims the benefit of United Kingdom Patent Application No. 2106950.5, filed on May 14, 2021, the contents of which are incorporated herein by reference in their entireties.

FIELD OF THE INVENTION

The present invention relates to a headers client, and more particularly to methods and systems for determining a best chain of block headers.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks up until one or more coinbase transactions. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. Proof-of-work requires a certain amount of energy to be spent, for example in the form of a hash rate. This energy penalty prevents a single entity from controlling the blockchain. For a single entity to control the blockchain, they would have to control enough hash rate to consistently mine subsequent blocks and would thus present their version of the blockchain as the correct one. It should be noted that the blockchain may be pruned at a node, and the publication of blocks can be achieved through the publication of mere block headers.

To spread crypto adoption, crypto payments have a need to work more closely to how fiat payments work, and specifically, traditional payment methods for items at a check-out counter. The customer needs to be able to spend their cryptocurrency without being online, putting the burden on the merchant to broadcast the transaction. To do this, a low bandwidth Simplified Payment Verification (SPV) system is a suitable solution. Customers will have wallets which can be offline the majority of the time, with only the ability to pay for transactions with contained block headers, UTXOs, input transactions and Merkle paths. Merchants, on the other hand, will have systems which can be branched throughout a location with a central hub, receiving those payments and broadcasting them to the blockchain.

SUMMARY

Aspects of the invention are set out in the independent claims and optional features are set out in the dependent claims.

According to a first aspect there is provided a computer implemented method performed at a headers client and comprising the following steps. Receiving a plurality of block headers from at least one external source, external to the headers client, the block headers each referring to a block in a blockchain. Storing the received plurality of block headers in a storage module. Analysing the plurality of block headers by validating the proof-of work for the plurality of received headers. Determining a best chain of block headers from the analysed plurality of block headers and storing the best chain at the storage module. The best chain can be a chain of blocks from genesis to a current best block, the current best block having the highest cumulative proof-of-work.

According to a second aspect there is provided a headers client. The headers client comprising an interface; a processor coupled to the interface; and a memory coupled to the processor, the memory having installed thereon computer executable instructions which, when executed, configure the processor to perform the method of the first aspect.

According to a third aspect there is a computer readable storage medium comprising computer-executable instructions which, when executed, configure a processor to perform the method of the first aspect.

According to a fourth aspect there is provided a system comprising: a headers client and a light client in communication with the headers client.

Throughout this specification the word "comprise", or variations such as "includes", "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF THE DRAWINGS

Aspects and embodiments of the present disclosure will now be described, by way of example only, and with reference to the accompany drawings, in which.

DETAILED DESCRIPTION OF EMBODIMENTS

Figure 1:
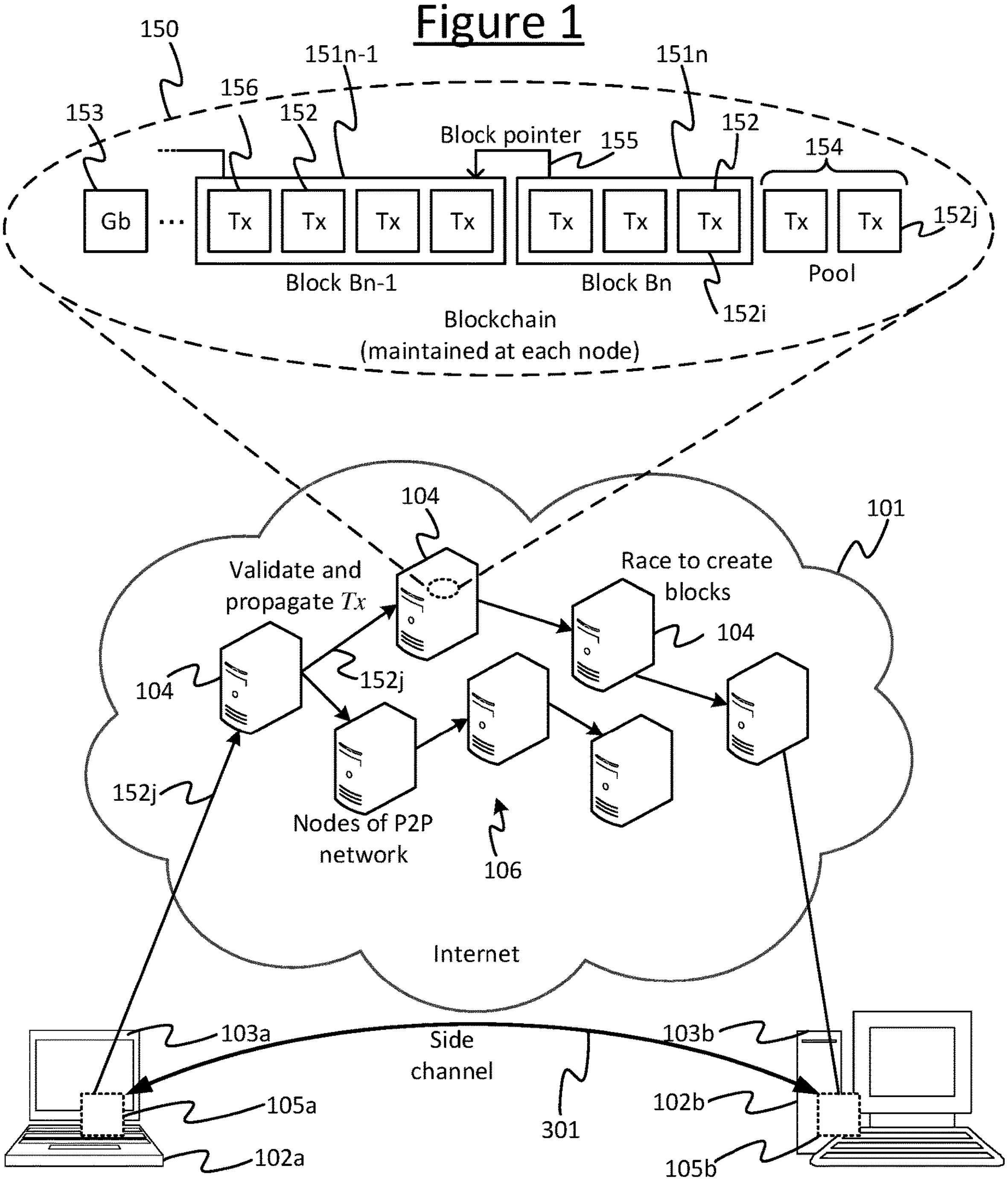
FIG. 1 shows an example system for implementing a blockchain.

We present a system herein which provides a best chain of block headers. This is achieved by an intermediate peer, referred to herein as a headers client, which can work in conjunction with a light client. The headers client determines a best chain of block headers through information provided by one or more pluralities of block headers corresponding to blocks in a blockchain. Benefits provided by the headers client described herein are low operating bandwidth, cheap storage and processing, and low running and storage cost.

Aspects and embodiments disclosed herein can provide a view of the best chain of block headers to light client systems, which can be useful for applications at the light client, such as for transaction verification.

The chain of blocks that nodes in a peer-to-peer network accept as the valid version of the blockchain is often referred to as the "best" or "longest" chain. To add a new block to the blockchain, processing power is needed and every block on the blockchain uses up energy to get there. A blockchain with more blocks in it, the "longest chain", will generally have taken more energy to build than a chain with fewer blocks in it, and as a rule nodes will adopt this chain over a "shorter" one. To be more precise, we refer to the chain with the most amount of work in it as the "best chain". In most cases the longest chain of blocks will also be the best chain of valid blocks. However, it will be understood that this may not always be the case, for example where a shorter chain has a greater amount of work than a longer one. The rule that all nodes in the network adopt the best chain of blocks allows every node on the network to agree on what the blockchain looks like, and therefore agree on the same transaction history. This means that computers acting independently over a network can maintain a globally shared view of the blockchain. The headers client can provide the best chain, also called a best chain of block headers, using block headers provided to it. Hereinafter, for ease of explanation only, the terms best and longest chain will be used interchangeably in this specification.

According to a first aspect of the present disclosure, there is provided a computer implemented method performed at a headers client and comprising the following steps. Receiving a plurality of block headers from at least one external source, external to the header's client, the block headers each referring to a block in a blockchain. Storing the received plurality of block headers in a storage module. Analysing the plurality of block headers by validating the proof-of work for the plurality of received headers. Determining a best chain of block headers from the analysed plurality of block headers and storing the best chain at the storage module.

The best chain can be a chain of blocks from genesis, which is a first block in the blockchain, to a current best block, which is a latest block in the blockchain. The best block may have the highest cumulative proof-of-work, which can be described as the most energy expended by the network in maintaining that particular branch of the blockchain.

In some examples, the plurality of block headers comprises all the block headers stored at an external source (i.e. from genesis to current best block).

The benefits of using a headers client is that block headers are lightweight because they do not contain transaction information. Light clients of Bitcoin generally do not possess a full replica of the blockchain and as such are much cheaper to run and require much lower bandwidths compared to a "full" or "miner" node. Light clients can rely on data provided to it by the headers client, for example concerning the best chain of block headers. A further benefit, therefore, may be to allow light clients to scale in line with their own data/transaction volumes, entirely unaffected by the volumes of data and transactions going into each block.

The headers client can determine a best chain of block headers which can be easily accessible to light clients, and which can also be updated as the blockchain is extended. Storage space of the storage module may be reduced compared to a "full" node of the blockchain because block headers are not data heavy, particular compared to a block on the blockchain itself. As such, the processing performed at the headers client can be fast compared to full nodes. In addition to lower storage space requirements, computing power required to operate the headers client may also be small compared to a full node and the headers client can be cheaper to run and maintain than a full node. For instance, a headers client may be run on a single board computing device, such as a Raspberry Pi.

The best chain of block headers determined at the headers client may provide an advantage to a light client, which can for example favourably interact with the headers client "off-chain" instead of interacting with nodes which are part of the blockchain network.

Optionally, analysing the plurality of block headers may further comprise determining a state of a block header of the plurality of block headers. Determining the state may comprise determining whether the block header is one or more of:

(i) in the best chain,
(ii) an orphan,
(iii) valid,
(iv) invalid,
(v) contended, and/or
(vi) if its status is unknown.

Knowing the state of a block can be advantageous, for example in transaction verification. If a block header is in the best chain, it's state could be useful to a light client in transaction verification. In other situations, the block header may be known to be not in the best chain, and therefore may correspond to an (as yet) unverified transaction. In yet further situations it may not be known if a block header is in the best chain of block headers or not, for example if it is an orphan or a contended block. If a block header is an orphan, in some cases it might later become part of the best chain of block headers, and in other cases it might not. A contended block can refer to a block that is valid but not yet orphaned. If a block header is invalid, it is unlikely to be part of the best chain. An invalid block may contain a reference to a block that violates a protocol, for example where the blockchain is a Bitcoin blockchain, a BTC block or a BCH block in a fork of the BSV blockchain.

Optionally, the method may further comprise marking the state of one or more block headers and/or a branch of block headers and storing the state in the storage module.

Storing the state of a block header can improve access to it when queried, for example by a light client. Additionally, the headers client can be prevented from re-doing all the work it has already done to determine the state of a block header. In some examples, the state can be updated if it changes, for example when a contended block becomes an orphan.

In some situations, two block headers can relate to two blocks at a same position, for example a same height, in the blockchain. Optionally, where analysis reveals that two block headers refer to two different blocks at a same height in the blockchain, the method may further comprise the following steps. Determining which block header is part of the best chain by validating the proof-of-work in the two block headers. Preferably, the method further determines that a first block header of the two block headers having a higher difficulty target and best proof of work is a best block and preferably adding the determined best block to the best chain. In some examples, the method may further comprise comparing and verifying the difficulty target of the block headers.

In some circumstances, forks appear where two nodes find a solution at the same time and two possible next blocks are simultaneously created. Comparing the proof-of-work advantageously determines which block is part of the best chain of block headers.

Optionally, the method may further comprise determining that a second block of the two block headers work is not part of the best chain of block headers, for example wherein the second block has a lower difficulty target and/or proof of work compared to the first block. A state of the second block header can optionally be recorded, for example as an orphan/invalid block. Blocks with an unverified difficulty target can optionally marked with the state "invalid".

In some examples, the at least one external source is in a peer-to-peer network. Optionally, the peer-to-peer network may be a Bitcoin network. Block headers may be sourced from nodes in the network, another headers client, or a light client. In some examples, block headers could be provided to the headers client in a basic text file. Block headers could be downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc. In other examples, functionality such as an API based service, also referred to as merchant API or M-API as set out in GB1914043.3 filed on 30 Sep. 2019 in the name of nChain Holdings Limited, may also be used for sourcing Block headers. This would involve the headers client requesting block headers information from merchant API, which would then fetch it from a selection of different miners. In this scenario, the headers client could query a plurality of different miners in one go through a central gateway.

An advantage of sourcing block headers from a peer-to-peer network is that block headers can be procured from a plurality of nodes on the network itself, which could help to provide up-to-date information to the headers client.

Optionally, sourcing the plurality of block headers from the peer-to-peer network may comprise the following steps. Sending a first message to a first peer in the peer-to-peer network, the first message comprising a request for a first plurality of block headers that are available at the first peer to be sent to the headers client. Receiving the first plurality of block headers stored at the first peer in response to the message. Further optionally comprising sending a second message to the first peer comprising a request for an identity of one or more other peers that the first node has interacted with in the peer-to-peer network and receiving identities of one or more other peers sent by the first peer in response to the second message. Then, sending the first message to the one or more received identities and receiving a second and/or further pluralities of block headers from the one or more other peers in response to the first message. The first and/or second pluralities of block headers received from each of the external sources may correspond to all of the blocks headers stored at each external source respectively. The identity provided by the first peer may provide the headers client with enough information about an external source such that the headers client can interact with it on the peer-to-peer network, for example an IP address of the external source.

Optionally, sourcing block headers may further comprise sending the second message to one or more received identities in the peer-to-peer network, receiving further identities of further peers that the one or more other peers have interacted with in the peer-to-peer network; and sending the first and/or second messages to the further identities until a plurality of block headers has been received from a threshold number of peers.

Sourcing block headers from external sources may comprise sourcing block headers from multiple nodes in a peer-to-peer network. Sourcing block headers from multiple nodes in the network can be beneficial for avoiding an eclipse attack, described in more detail below. An example minimum number of nodes for avoiding an eclipse attack may be two nodes which are strictly independent of each other. Receiving block headers from more than two nodes can be further advantageous and can still be very cheap and quick to run.

In some examples the headers client may output information. This could include outputting the best chain of block headers or a pointer to the best chain of block headers stored at the storage module, for example from the headers client to a light client.

In transaction verification, for example at a light client, outputting the best chain of block headers or a pointer to the best chain can be advantageous. A transaction may be determined to be verified if it corresponds to a block header in the best chain of block headers and determined to be not verified otherwise.

In some examples, a particular block header or a pointer to the particular block header stored at the storage module can be output. Optionally, the output may comprise a state of the particular block.

Light clients may be interested in certain transactions relating to their own activities and it may be more efficient in some cases to output block header(s) or pointer(s) to block header(s), and not the entire best chain of block headers.

In some examples, an output can be output in response to a request from a light client, for example a light client may make a specific request to the headers client concerning a particular block. This may be performed through an application run at the light client for example.

Optionally, the method further comprises steps for verification of transactions using the best chain of block headers. Comprising, for example, verifying that a transaction is a valid transaction by determining that a block header relating to the transaction is in the best chain of block headers.

Optionally, verifying the transaction at a light client. Light clients can be generally interested in verifying their own transactions. The light client can achieve this by determining that a block header relating to their own transaction(s) is present in the best chain.

Optionally, block headers may be tracked, wherein tracking enables monitoring the current best block of the blockchain. Tracking block headers can be advantageous in helping to maintain an up-to-date version of the best chain of block headers and an accurate state of block headers. Block headers can be tracked through connection to the blockchain network and by receiving block headers from said network on a rotating basis.

In some examples, tracking block headers further comprises tracking block headers that are orphans. The method may further comprise pruning orphans that are not part of the best chain and/or marking orphans as invalid. Tracking orphans can be advantageous in determining the current best block of the best chain.

Optionally, the at least one external source may provide the headers client with additional information in addition to the block headers including one or more of: a URL associated with the external source of the received block headers, endpoint URLs, miner ID of the blocks referenced by the block header, a Coinbase and/or inclusion proofs.

MinerReputation relates to the measure of a miner's performance i.e. how well does a miner execute transactions at the promised or quoted current fee. The reputation score/indicator may be calculated, maintained and managed by each payment processor.

Miner ID may be a two-part datum that is added to a Coinbase transaction when a block is mined. If there is no Miner ID present, the payment processor may tag that miner with a Miner ID of "NULL" or simply left blank.

Optionally, with the additional information, the method may further comprise one or more of: analysing a risk profile of a particular miner or miners, identifying a reputation of one or more miners, and/or determining which miners produce the most blocks. Further statistical information could be determined from the data provided to the headers client via the block header. Such as share of the hash power over time or the number of orphans in the network.

Example System Overview

FIG. 1 shows an example system 100 for implementing a blockchain 150. The system 100 may comprise of a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Blockchain nodes 104 runs software configured to validate transactions 152 according to the blockchain node protocol, and to forward transactions 152 in order to propagate them throughout the blockchain network 106.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as Application Specific Integrated Circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 160. Maintaining a copy of the blockchain 150 does not necessarily mean storing the blockchain 150 in full. Instead, for example at a headers client 102*a* or light client 102*b*, the blockchain 150 may store limited information related to a block, such as the block header 156 of each block 151. Each block 151 in the chain comprises one or more transactions 152, wherein a transaction in this context refers to a kind of data structure.

Each block 151 also comprises a block pointer 155 pointing back to the previously created block 151 in the chain so as to define a sequential order to the blocks 151. A headers client which receives block headers 156 can effectively build up a version of the blockchain by ordering the block headers 156 into the sequential order, using the pointer to arrange them sequentially. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 complete with block header 156 to be propagated throughout the network 106. Each blockchain node 104 is configured to create blocks 151 and to store a respective copy of the same blockchain 150 in their respective memory. Each blockchain node 104 also maintains an ordered set 154 of transactions 152 waiting to be incorporated into blocks 151. The ordered set 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output. Each of the ordered set 154 also comprise a block header 156 associated with the transactions 152*j*.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order. The preceding transaction 152*i* could equally be called the antecedent or predecessor transaction. Orphan blocks may exist, which are blocks that are not accepted into the blockchain network due to a time lag in the acceptance of the block in question into the blockchain, as compared to the other qualifying block.

Blockchain nodes 104 validate transactions and also race to be the first to create blocks of transactions in a process commonly referred to as mining, which is supported by "proof-of-work". At a blockchain node 104, new transactions are added to an ordered set 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered set of transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. The block header 156 of the new block 151 records information including a version, a previous block hash, a Merkle root, a timestamp, a difficulty target and a nonce. A block pointer 155 is also assigned to the new block 151*n* pointing back to the previously created block 151*n*−1 in the chain. A significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The version of the blockchain maintained at each blockchain node 104 can be sent to the headers client in the form of block headers when queried. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the ordered set of yet to be published transactions 154 at any given time, depending on when they started searching for a solution or the order in which the transactions were received, and so block headers 156 received by a headers client 102*a* from a number of different nodes 104 in the network 106 may or may not include transactions that have been verified, and/or may comprise block headers 156 which are in varying orders. To determine the best chain it can therefore be preferable to receive block headers from multiple blockchain nodes 104.

Full blockchain nodes 104 on the blockchain network can validate the node's hash solution and determine whether the proposed block warrants the further checking required to secure its place as the top-most link in the best chain of valid proof-of-work, which in most cases may also be the longest chain as mentioned above. Block headers are propagated throughout the network. Some of which refer to block which may not be (yet) part of the best chain.

Due to the resources involved in transaction validation and publication, typically at least each of the blockchain nodes 104 takes the form of a server comprising one or more physical server units, or even a whole data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users, for example a headers client 103*a* and a light client 103*b*. These users may interact with the blockchain network but do not participate in constructing or propagating transactions and blocks. Some of these users or agents 103 may act as senders and recipients in transactions but may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients", which includes headers clients and light clients) may be said to be part of a system that includes the blockchain network; however, these users are not blockchain nodes 104 as they do not perform the roles required of the blockchain nodes. Instead, each party 103 may interact with the blockchain network 106 and thereby utilize the blockchain 150 by connecting to (i.e. communicating with) one or more blockchain nodes 104 in the blockchain network 106. Two such clients 103 and their respective equipment 102 are shown for illustrative purposes: a headers client 103*a* and respective computer equipment 102*a*, and a light client 103*b* and respective computer equipment 102*b*. It will be understood that many more such parties 103 and their respective computer equipment 102 may be present and participating in the system 100, but for convenience they are not illustrated. It will also be understood that the clients 103*a*, 103*b* are illustrated as separate entities for illustration purposes and in some examples the headers client 103*a* and the light client 103*b* may run on the same computer equipment 102*a/b*. In other examples, one headers client 103*a* may interact with a plurality of light clients 103*b* and/or a light client 103*b* may interact with several headers clients 103*a*. Each party 103 may be an individual or an organization.

The computer equipment 102 of each client 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of a party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

Headers clients 102*a* and light clients 102*b* do not have the ability to store the full blockchain comprising the full transaction history and are designed to run on space and power constrained devices. However, in some examples, block headers and/or a local copy of the best chain of block headers may be stored at a local storage module.

Headers and light client devices may include, for example, computer equipment 102, smartphones, tablets or other embedded systems. In some examples, clients 103 can be deployed as server-side software, for example on linux and Windows, which provides an API for querying the state of a given block header.

As shown in FIG. 1, the client application on each computer equipment 102*a*, 120*b* respectively may comprise additional communication functionality. This additional functionality enables a headers client 103*a* to establish a separate side channel 301 with a light client 103*b* (at the instigation of either party or a third party). The side channel 301 enables exchange of data separately from the blockchain network. Such communication is sometimes referred to as "off-chain" communication. For instance this may be used to exchange transaction data 152 between the headers client 103*a* and a light client 103*b* to exchange any transaction related data, such as keys, negotiated amounts or terms, data content, block headers, or a status of a block in the best chain as maintained at a headers client 103*a*.

The side channel 301 may be established via the same packet-switched network 101 as the blockchain network 106. Alternatively or additionally, the side channel 301 may be established via a different network such as a mobile cellular network, or a local area network such as a local wireless network, or even a direct wired or wireless link between the devices 102*a*, 102*b*. Generally, the side channel 301 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 301. Note therefore that if it is said that the headers client 103*a* and the light client 103*b* exchange certain pieces of information or data, or such like, over the side channel 301, then this does not necessarily imply all these pieces of data have to be send over exactly the same link or even the same type of network.

The instance of the client application or software 105 on each computer equipment 102 is optionally operatively coupled to at least one of the blockchain nodes 104 of the network 106. This enables the client 105 to receive block headers, or where appropriate, full blocks from the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on computer equipment 102*b* is configured to formulate and send transactions 152 according to a transaction protocol.

In some examples, headers client 102*a* and/or light client 102*b* may interact with the blockchain 150 via an intermediary platform or service. In one example a platform processor as set out in GB2002285.1 filed on 19 Feb. 2020. The platform processor may be responsible for relaying communications between the headers client 102 and/or light client 102*b*, and blockchain 150. In another example, an alias based addressing service, such as described in U.S. Ser. No. 16/384,696 filed on 15 April 2019 in the name of nChain Holdings Limited, can also be used interaction with the blockchain 150. In another example, a channel service for enabling direct or peer to peer secure communication between entities or end users for transfer of data or information associated with blockchain transactions may also be used by the headers client 102*a* or light client 102*b*, such as described in GB2007597.4 filed on 21 May 2020 in the name of nChain Holdings Limited. In another examples, functionality such as an API based payment service, also referred to as merchant API or M-API, for payments or other transactions between client or merchant entities, such as set out in GB1914043.3 filed on 30 Sep. 2019, may also be used. All of the above referenced applications were filed in the name of nChain Holdings Limited.

Network Transactions

Transactions in the blockchain are used to perform one or more of the following: to convey a digital asset (i.e. a number of digital tokens), to order a set of journal entries in a virtualised ledger or registry, to receive and process timestamp entries, and/or to time-order index pointers.

Nodes of the blockchain network (often referred to as "miners") perform a distributed transaction registration and verification process. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application such as light client 103*a*) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks but may in some cases be stored locally at the node 104 for a short period of time. Assuming the transaction is validated and thereby accepted onto the blockchain, the transaction (including any user data) will thus remain registered and indexed at each of the nodes in the blockchain network as an immutable public record.

The node who successfully solved the proof-of-work puzzle to create the latest block, or last block, is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. Nevertheless, blocks (including block headers) of invalid transactions may still exist in the network. The widespread publication of information allows users to continuously audit the performance of nodes. The publication of the mere block headers allows participants to ensure the ongoing integrity of the blockchain. Analysis of block headers at a headers client further improves this.

Headers and Light Client Software

The client application 105*a*, 105*b* may be initially provided to the computer equipment 102*a*, 102*b* of any given party 103*a*, 103*b* on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc. In some examples, block headers may also be provided to the headers client application 105*a* this way.

The headers client application 105*a* comprises at least functionality for deriving a best chain of block headers and means for communicating with a light client 102*a*. It may also comprise means for sourcing block headers from, for example, the peer-to-peer network 106. Sourcing block headers could alternatively be performed through the merchant API mentioned above.

The client application 105*b*, such as used by a light client 102*b*, may comprises a "wallet" function. This has two main functionalities. One of these is to enable the party 103*b* to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

Figure 2:
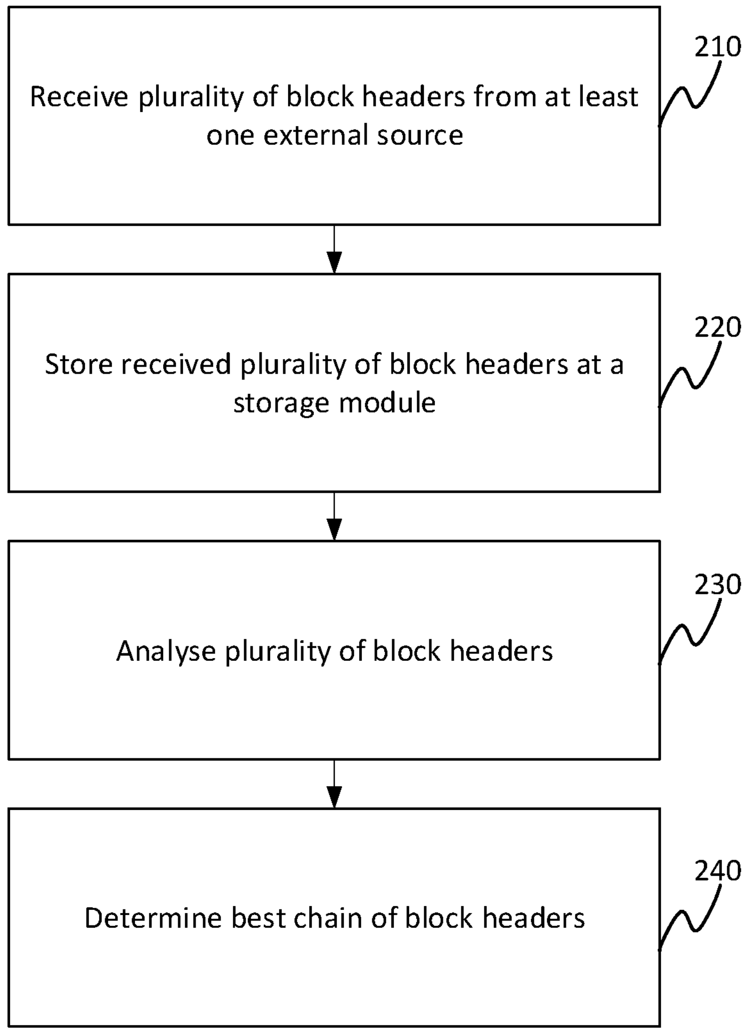
FIG. 2 illustrates a method for determining a best chain of block headers at a headers client.

FIG. 2 illustrates a method for determining a best chain of block headers at a headers client 102*a*. The method is executed by client application 105*a* and includes steps which can be performed at the headers client 102*a* itself and/or in combination with another external source such as a light client 102*b* and/or peers of a peer-to-peer network 106 such as nodes 104.

At step 210 a plurality of block headers is received at the headers client 102*a* from at least one external source. External sources can be, for example, a random or a rotating subset of blockchain nodes 104 in the peer-to-peer network 106. Sourcing a plurality of block headers from external sources is described in more detail below in relation to FIG. 3. The plurality of block headers may refer to a version of the blockchain as stored at a blockchain node 104. In some cases more than one plurality of block headers may be received at the headers client, for example received from a plurality different external sources, such as blockchain nodes 104.

A block header comprises: a version, a previous block hash, a Merkle root (hash of the root of the Merkle tree of the block's transactions), a timestamp, a difficulty target (proof of work algorithm difficulty target for the block), and a nonce (counter used for proof-of-work algorithm). The block header is the first piece of information propagated by a node when it finds a valid block solution and provides the headers client 102*a* with information about the transaction or block that it relates to.

A block header contains the following fields:

| Field | Purpose | Updated when . . . | Size (Bytes) |
|---|---|---|---|
| Version | Block version | | 4 |
| hashPrevBlock | 256-bit hash of the previous block header | A new block comes in | 32 |
| hashMerkleRoot | 256-bit hash based on all of the transactions in the block | An updated Merkle tree is completed | 32 |
| Time | Current block timestamp as seconds since 1970-01-01T00:00 UTC | Every few seconds | 4 |
| Bits | Current target in compact format | The difficulty is adjusted (approximately every 2 weeks) | 4 |
| Nonce | 32-bit number (starts at 0) | A hash is tried (increments) | 4 |

hashPrevBlock

The hash of the previous block header connects the block headers to the previous block in the blockchain. This piece of information can be used by headers client to arrange a plurality of block headers received from an external source into a sequential order that represents the blockchain from genesis to current best block, where the current best block is the latest block to be added to the blockchain. Arranging block headers in the correct order is performed by checking if the hash values sequentially match up to refer to each other.

hashMerkleRoot

This represents the hash of the root of the Merkle tree of this block's transactions. It contains a summary of all the transactions in the block. A Merkle tree is a data structure which is used to efficiently summarize and verify the integrity of large data sets, comprising binary trees containing cryptographic hashes. A Merkle tree is constructed by recursively hashing pairs of nodes until there is only one hash, called the Merkle root. The cryptographic hash algorithm used in Bitcoin's Merkle trees is double-SHA256.

To prove that a specific transaction is included in a block, a full node produces a Merkle path connecting that transaction to the root of the tree.

Time

The approximate creation time of the block.

Bits

In a Bitcoin network, the target is a 256-bit number that all Bitcoin clients share. The double SHA-256 hash of a block's header must be less than or equal to the current target for the block to be accepted by the network. The lower the target, the more difficult it is to generate a block.

Difficulty is a measure of how difficult it is to find a hash below a given target. It has a close relationship with target but is not the same thing. Rather it has an inverse relationship where a higher difficulty implies a lower target value. The Bitcoin network has a global block difficulty and valid blocks must have a hash below this target. Generally speaking, the higher the difficulty, the greater the computational processing power needed to obtain a hash value below the corresponding target.

If a headers client receives a block header with a difficulty target which is incorrect, it can determine that its state is "invalid".

Nonce

The nonce is a counter used for the Proof-of-work algorithm. A proof-of-work is a piece of data which is difficult (costly and/or time-consuming) to produce but easy for others to verify. Proof-of-work production usually involves a computational task that includes a random process with low probability of success, so that a lot of trial and error is required on average before a valid proof-of-work is generated. In Bitcoin the proof-of-work scheme is based on the SHA-256 hashing algorithm.

Bitcoin uses a proof-of-work system in the process of mining. For a block to be accepted, the broadcasting node must demonstrate proof of valid work which covers all of the data in the block. The difficulty of discovering valid work outcomes is adjusted to limit the average growth rate of the block chain.

For a block to be valid, a nonce must be discovered that results in the double SHA-256 hash of the block header, to a value less than the current target. This indicates that the node which discovered this block is an active participant in the network. Each block header contains the hash of the block being built upon, thus creating the chain of blocks that comprise the ledger. Changing a block can only be done by making a new block, containing the same predecessor, and requires regenerating all subsequent blocks by redoing the work they contain. This protects the block chain from tampering.

For a block to be accepted by the Bitcoin network, Miners must complete a proof-of-work which covers all of the data in the block. The difficulty of this work is adjusted to limit the rate at which new blocks can be generated by the network. Due to the very low probability of successful generation, it is impossible to predict which computer will generate the next block. The low probability of successfully finding valid proof-of-work solutions reduces the likelihood that two or more Miners generate a block around the same time. However, this can happen on occasion.

At step 220 the received plurality of block headers is stored at a storage module. In some examples, the storage module may be located local to the headers client 102*a*, and in other examples it may be located externally to the headers client. The storage module may be a database in some examples. The storage module stores one or more of: block headers, the best chain of block headers, a history of the blockchain including invalid branches, and/or a state of block headers. Light client 102*b* may be able to access the storage module or query the headers client 102*a* about particular block headers stored therein. In some examples, the headers client may be run as software on the light client 102*a*.

At step 230 analysis is performed on the plurality of block headers. Analysis can include validating the proof-of-work of the received block headers using information contained therein. Whether a block header is in a best chain of block headers can be determined from the block header by analysing the difficulty and/or proof-of-work and, for example, determining that a block header that has a high difficulty and a valid proof-of-work is part of the best chain. Alternatively, if a block header has a low difficulty or is invalid in some way, this can also be determined.

Analysing the block headers is performed independently at the headers client in some examples whilst in other examples, analysing can be performed in conjunction with a light client and/or a blockchain node 104.

At a fourth step 240 a best chain of block headers is determined. The best chain of block headers can be further stored at the storage module. The best chain is a chain of blocks from genesis, which is a first block in the blockchain, to a current best block, which is a last block in the blockchain as described above. "Current best block" may refer to a block which is the latest block to be verified on the blockchain and have the highest cumulative proof-of-work. This best chain of block headers can be viewed or provided to light clients 102*b*. A version or graph of the blockchain from genesis to current best block which further includes branches and/or blocks which are not part of the best chain can additionally be built by the headers client and optionally stored at the storage module.

The best chain and network state can be stored and/or maintained somewhere, for example at a storage module, which in some examples could be local to a headers client 102*a* or light client 102*a*. Storing a copy locally removes the requirement to download the entire chain of block headers from genesis again, for example after a restart of the headers client software.

Two block headers received at the headers client may in some cases refer to two different blocks at a same height in the blockchain, i.e. at a "fork". A protocol exists for resolving any fork that may arise, where two blockchain nodes 104 solve their puzzle within a very short time of one another such that a conflicting view of the blockchain gets propagated between nodes 104. In short, whichever prong of the fork grows the longest becomes part of the longest chain and therefore will likely become part of the definitive blockchain 150 and the best chain of block headers. Note this should not affect the users or agents of the network as the same transactions will appear in both forks, and that both blocks can be valid.

In some examples, the headers client can mark and/or track block headers relating to orphans. Tracking can be achieved by maintained connection to the blockchain network along with receival of new and/or updated pluralities of block headers from the network.

A way of determining which of two forked branches is the best chain is to determine the depth of the block relating to the transaction in the blockchain. If the block has a certain number of blocks built on top of it (for example six blocks), it can be inferred that this is the longest chain, which is often also the best chain.

A state of a block or branch of blocks can be saved and stored. A state may comprise one of the following: "in the best chain of block headers", "valid", "orphan", "invalid", "unknown". In some embodiments, block headers can be marked as valid or invalid in line with the above described determination. This information can be stored, for example in a database or storage module, and can be used to build a graph of the blockchain from the genesis block.

In some embodiments, light clients 102*b* may ask a headers client 102*a* for a state of a particular block header. For example, to check whether a transaction is in the best chain of block headers.

Sourcing Block Headers

A database accessible to the headers client 102*a* and/or light client 102*b* may be populated from the network 106, for example a Bitcoin network, by synchronising header messages in real-time from a rotating subset of all peers on the network 106. The longest/best chain is advantageously independently sourced from a random and rotating selection of all peers, to eventually synchronise with all peers. This advantageously can help to prevent eclipse attacks on the verification process, and therefore the creation of adversarial forks if a malign party has access to or controls a number of nodes or IP addresses in the blockchain network. An eclipse attack is one where the malign party may try to hide a valid chain of block by providing incorrect proofs that can still be mathematically traced back to a block, but that block may be one that is invalid or may have been generated by the malign party.

Receiving block headers from multiple sources at the headers client 102*a* also ensures that the information it receives represents the most accurate representation of the blockchain and the current best block. In some examples, the headers client 102*a* may source block headers from external sources until a number of external sources interacted with exceeds a predetermined threshold. In one example, the predetermined threshold may be two strictly independent nodes but in other examples could be up to and include all the nodes on the network. In some examples, the headers client may source block headers from a rotating set of external sources, for example from around twelve external sources at a time.

Figure 3:
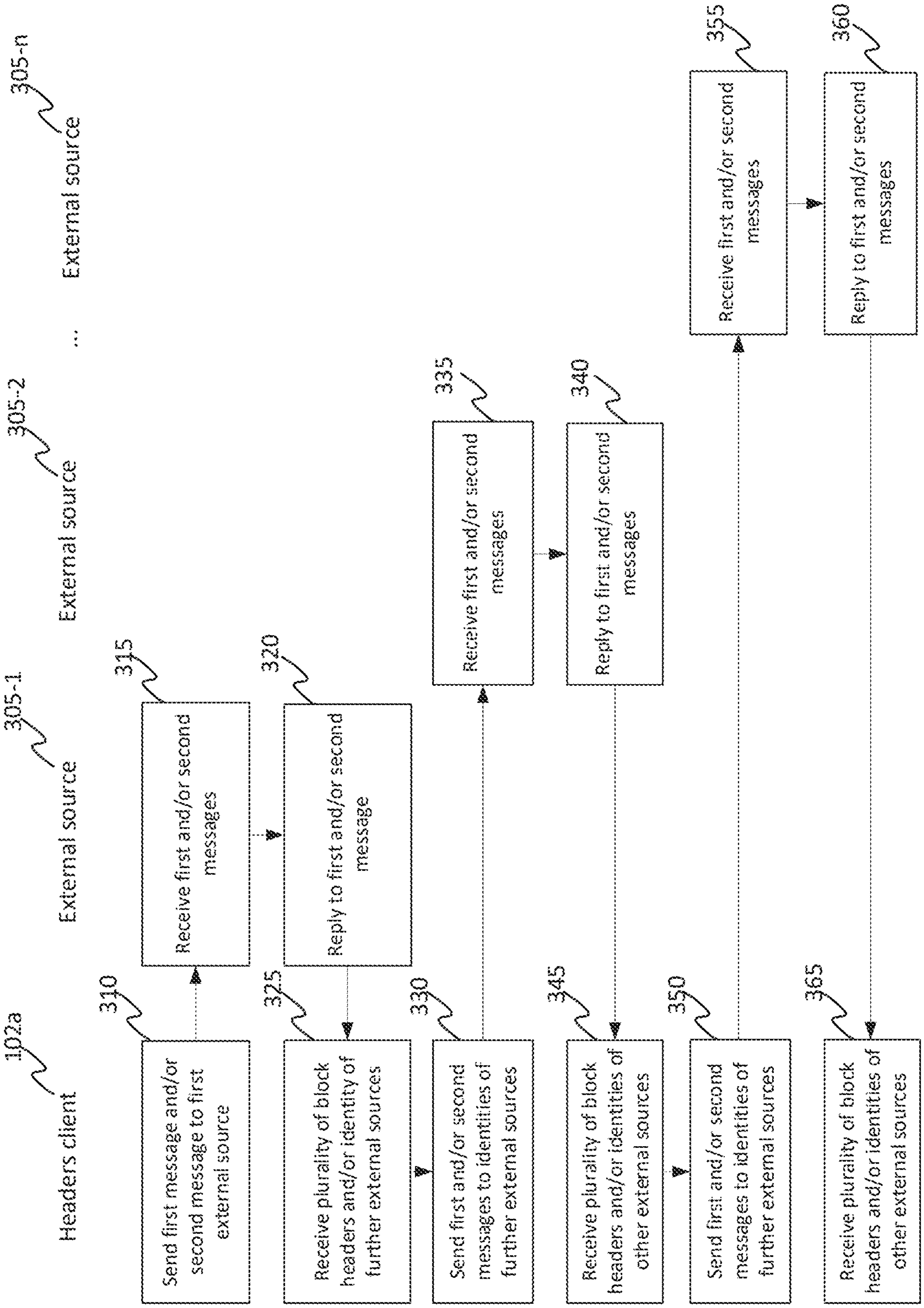
FIG. 3 illustrates sourcing block headers at a headers client from a plurality of external sources.

FIG. 3 illustrates sourcing block headers at a headers client 102*a* from a plurality of external sources 305-1, 305-2, . . . 305-*n*. Block headers can be retrieved, or sourced, in one example by the headers client application 105*a* through interaction with external sources 305-1, 305-2, . . . 305-*n*, which may be a node 104 or other peer in the network 106 in some examples.

At a first step 310, the headers client 102*a* sends a first message to first external source 305-1 asking for block headers and/or sends a further second message to first external source 305-1 asking for identities of other external sources. To get a block header or block headers from one or more external sources 305-1, 305-2, the headers client 102*a* sends a first message, such as a "getheaders" message. This message returns a headers packet containing the headers of blocks starting from the last known hash in a block locator object, up to hash_stop or 2000 blocks, whichever comes first. To receive the next block headers, the headers client 102*a* will be required to issue the getheaders message again with a new block locator object.

At a second step 315, the first external source 305-1 receives the first and/or second messages sent by the headers client 102*a*.

At step 320, the first external source 305-1 sends a plurality of block headers stored at the external source in response to the first message and an identity of a second external source 305-2. The plurality of block headers may comprise all the block headers stored at the external source 305-1. By interacting with multiple external sources such as nodes 104, the headers client can be provided with many pluralities of block headers very quickly.

At step 325 the headers client 102*a* receives the block headers and the identity of the second external source 305-2 from the first external source 305-1. It will be appreciated that the first external source 305-1 may send more than one identity of further external sources, for example a plurality of identities of up to n external sources 305-*n*.

At step 330, the headers client 102*a* repeats step 310 by sending the first and/or second messages, but this time sends the messages to the second external source 305-2, whose identity may have been supplied to the headers client 102*a* by the first external source 305-1.

At step 335 the second external source 305-2 receives the first and/or second messages sent by the headers client 102*a*.

At step 340 the external source 305-2 sends block headers stored at the second external source 305-2 in response to the first message and/or an identity, or identities, of a further external source(s).

At step 345 the headers client 102*a* receives the block headers and/or identity of the external source(s) from the second external source 305-2.

At step 350 the headers client 102*a* repeats step 310 by sending the first and/or second messages, but this time sends the messages to the external source 305-*n*. In some examples, the steps 330 and 350 may happen at the same time, for example where the identity of external source 305-*n* was supplied by the first external source 305-1.

Steps 335 and 360 are repeats of steps 315 and 320 at the first external source 305-1 and steps 335 and 340 at the second external source 305-2 respectively.

At step 365 a plurality of block headers and/or identities of other external sources are received at the headers client 102*a*.

The process steps 310 to 365 may be repeated any number of times at any number of external sources. Sourcing block headers may stop, for example, when a threshold number of external sources have been interacted with. In some examples, the sourcing process illustrated in FIG. 3 may repeat periodically or at the demand of an operator to collect more block headers from the network 106. This can be done to maintain an up-to-date version of the best chain of block headers as more blocks are added to the blockchain 150 in the blockchain network 106.

In some examples, the headers client 102*a* can request block headers and additional information. Such additional information may be: a URL associated with the external source of the received block headers, miner ID (which is a unique identifier for a miner node) of the blocks referenced by the block header, endpoint URLs, inclusion proofs and/or a Coinbase.

This additional information may be used, for example by a light client, to analyse a risk profile of a particular miner or miners, identify or determine a reputation of one or more miners, and/or determine which miners produce the most blocks. This information can be useful to a light client 102*b* that wants to know which miners are reliable and/or have a good reputation, for example to inform a decision about which node to send a transaction to. Statistical data may be determined from the additional information, such as a share of the hash power over time, number of orphans, etc.

In other examples, block headers can be sourced from other external sources, such as another headers client 102*a*, or another "off-chain" source.

Figure 4A:
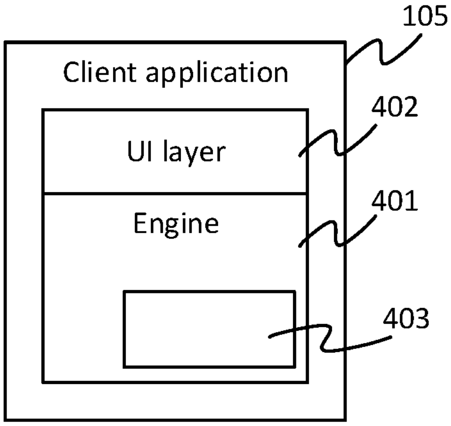
FIG. 4A illustrates an example implementation of the client application for implementing embodiments of the presently disclosed scheme.

FIG. 4A illustrates an example implementation of the client application 105, such as a headers client application 105*a* or a light client application 105*b*, for implementing embodiments of the presently disclosed scheme. The client application 105 comprises an engine 401 and a user interface (UI) layer 402. The engine 401 is configured to implement the underlying functionality of the headers client 105*a* and/or light client 105*b* as appropriate. A headers client application 105*b* may implement functionality such as to, receive and/or send block headers and/or a state of a particular block header and/or other data over the side channel 301 to the light client. Light client application 105*b* may implement functionality for querying the best chain of block headers.

In accordance with embodiments disclosed herein, and as described for example in more detail in GB 2102217.3 filed on 17 Feb. 2021 in the name of nChain Holdings Limited, the engine 401 of the light client 105*b* comprises a function 403 for querying the headers client in relation to the best chain of block headers. The light client 102*b* can construct transactions and submit them for inclusion in the blockchain. They can also learn about the state of their transactions (or transactions from other clients) from external sources. They may become convinced that a transaction has been included in the blockchain if they are in possession of the following data:

The transaction whose inclusion is to be proved.

A Merkle inclusion proof of that transaction, which shows that a transaction contributed towards a Merkle root value.

A Bitcoin SV block header, which includes a Merkle root.

The best chain of block headers, as measured by proof-of-work.

Verification of a transaction inclusion for a light client can be performed as follows. First, the light client 102*b* requests or views a block header stored at the headers client that relates to a particular transaction, for example a light client may view the best chain. The light client calculates the Merkle tree's root from the source transaction and inclusion proof. Faking a proof is as difficult as reversing a cryptographically strong hash function; that is, it is considered effectively impossible. The light client verifies that the Merkle root calculated in the previous step matches the Merkle root declared in the specified block header. The light client also uses the best chain of block headers to verify that the specified block header is present in the best chain. If all of these checks pass, then the transaction was included in the blockchain and the light client determines that the transaction is verified.

A Merkle proof may include the following data:

a transaction identifier (TxID) of a blockchain transaction that the Merkle proof relates to;

a block header of the block in which the blockchain transaction is included; and an array of sibling hashes for the transaction identifier (TxID).

Establishing the existence of a transaction can be undertaken by requesting or determining a Merkle path proof at and validating the Proof-of-Work.

The headers client 102*a* operates as described above and may be used to source the longest/best chain of headers. As it can be open source, it may also be inspected by an independent verifier entity, to ensure that the chain identified faithfully and truthfully represents the longest/best chain of block headers. Alternatively, other implications may be available or an independent verifier may implement their own headers client 102*a* to source the required data.

There exist public block explorer services. Whether these services are through web interfaces or through API, these public block explorers usually offer functionality to fetch block metadata when given a block hash. As with sourcing headers, if using third party or independent data sources, a selection of sources may preferably be used. This is to advantageously mitigate the possibility of a single or few external actors controlling the view of the blockchain, as seen by any independent verifier.

Note: whilst the various functionality herein may be described as being integrated into the same or different client applications 105*a*, 105*b*, this is not necessarily limiting and instead they could be implemented as a single application on a combined headers client-light client device. Alternatively, they could be implemented in a suite of two or more distinct applications, e.g. one being a plug-in to the other or interfacing via an API (application programming interface). For instance, the functionality of the engine 401 may be implemented in a separate application than the UI layer 402, or the functionality of a given module such as the engine 401 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

In an example, the light client 102*a* may want to know a state of a particular block. The headers client can return the full block header, together with its current state (in best chain, orphaned, unknown, etc.) by an API get header by hash. In some embodiments, the channel or message function(s) include(s) a JavaScript Object Notation (JSON)-over-Hyper Text transfer protocol (HTTP) API for the account, to enable access, creation and/or management of one or more messages by the client or the other entity.

Figure 4B:
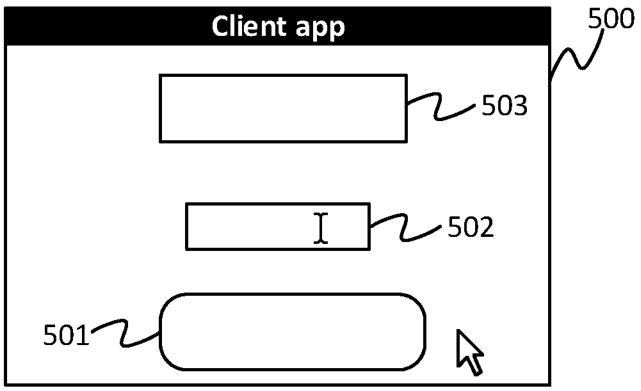
FIG. 4B illustrates a mock-up of an example of a user interface which may be rendered by the user interface layer of a client application on a light client equipment.

FIG. 4B gives a mock-up of an example of the user interface (UI) 500 which may be rendered by the UI layer 402 of the client application 105*b* on a light client equipment 102*b*. It will be appreciated that a similar UI may be rendered by the on the headers client equipment 102*a*, or that of any other party.

By way of illustration FIG. 2B shows the UI 500 from the light client's perspective. The UI 500 may comprise one or more UI elements 501, 502, 502 rendered as distinct UI elements via the user output means.

For example, the UI elements may comprise one or more user-selectable elements 501 which may be different on-screen buttons, or different options in a menu, or such like. The user input means is arranged to enable the user 103 to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands). The options enable the user (light client) to request a state of a particular block header or a version of the best chain.

Alternatively or additionally, the UI elements may comprise one or more data entry fields 502, through which the user can request a state of a block by reference to a block header stored at the headers client, for example. In some embodiments the full block header may be requested and sent to a light client from a headers client. These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 503 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 500 shown in FIG. 3 is only a schematized mock-up and in practice it may comprise one or more further UI elements, which for conciseness are not illustrated.

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin or the BSV blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. Other network entities (or network elements) such as a headers client 102*a* or a light client 102*b* perform one or some but not all of these functions.

In non-preferred embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

The invention claimed is:

1. A computer implemented method comprising the steps of:

receiving, at a headers client comprising an intermediate peer, a plurality of block headers from at least one external source, wherein the at least one external source is external to the headers client, the block headers each referring to a block in a blockchain;

storing the received plurality of block headers in a storage module;

analysing the plurality of block headers by validating a proof-of-work for the plurality of received headers; and determining a best chain of block headers from the analysed plurality of block headers and storing the best chain at the storage module.

2. The method of claim 1 wherein the best chain is a chain of blocks from genesis to a current best block in the blockchain having the highest cumulative proof-of-work.

3. The method of claim 1, wherein analysing further comprises:

determining a state of a block header of the plurality of block headers, wherein determining the state comprises determining whether the block header is one or more of:

(i) in the best chain, (ii) an orphan, (iii) valid, (iv) invalid, (v) contended, and/or (vi) if its status is unknown.

4. The method of claim 3, further comprising:

marking the state of the block header and/or a branch of block headers and storing the state in the storage module.

5. The method of claim 1, wherein analysis reveals that two block headers refer to two different blocks at a same height in the blockchain and:

determining which block header is part of the best chain by validating the proof-of-work in the two block headers;

determining that a first block header of the two block headers having a higher difficulty target and best proof of work is a best block; and adding the best block to the best chain.

6. The method of claim 5, further comprising:

determining that a second block of the two block headers is not part of the best chain.

7. The method of claim 1, wherein the at least one external source is in a peer-to-peer network.

8. The method of claim 7, wherein sourcing the plurality of block headers from the peer-to-peer network comprises:

sending a first message to a first peer in the peer-to-peer network, the first message comprising a request for a first plurality of block headers that are available at the first peer to be sent to the headers client;

receiving the first plurality block headers stored at the first peer in response to the first message;

sending a second message to the first peer comprising a request for an identity of one or more other peers that the first peer has interacted with in the peer-to-peer network;

receiving identities of one or more other peers sent by the first peer in response to the second message;

sending the first message to the one or more received identities; and receiving a second plurality of block headers from the one or more other peers in response to the first message.

9. The method of claim 8, further comprising:

sending the second message to the one or more received identities;

receiving further identities of further peers that the one or more other peers have interacted with in the peer-to-peer network; and sending the first and/or second messages to the further identities of the further peers until a plurality of block headers has been received from a threshold number of peers.

10. The method of claim 1, further comprising:

outputting the best chain of block headers or a pointer to the best chain of block headers stored at the storage module.

11. The method of claim 10 wherein the output is output in response to a request from a light client.

12. The method of claim 1, further comprising:

outputting a particular block header or a pointer to the particular block header stored at the storage module, wherein the output comprises a state of the particular block.

13. The method of claim 1, further comprising:

verifying that a transaction is a valid transaction by determining that a block header relating to the transaction is in the best chain of block headers; and verifying the transaction at a light client.

14. The method of claim 1, further comprising tracking block headers.

15. The method of claim 14, further comprising:

tracking headers that are orphans; and pruning orphans that are not part of the best chain and/or marking orphans as invalid.

16. The method of claim 1, wherein the at least one external source provides the headers client with additional information in addition to the block headers including one or more of: a URL associated with the external source of the received block headers, endpoint URLs, miner ID of the blocks referenced by the block header, a Coinbase and/or inclusion proofs.

17. The method of claim 16, further comprising one or more of: analysing a risk profile of a particular miner or miners, identifying a reputation of one or more miners, and/or determining which miners produce the most blocks.

* * * * *